(12) United States Patent
Koorapaty et al.

(10) Patent No.: US 12,004,107 B2
(45) Date of Patent: *Jun. 4, 2024

(54) TIME AND FREQUENCY SYNCHRONIZATION

(71) Applicant: TELEFONAKTIEBOLAGET LM ERICSSON (PUBL), Stockholm (SE)

(72) Inventors: Havish Koorapaty, Saratoga, CA (US); Mattias Frenne, Uppsala (SE); Daniel Larsson, Lund (SE); Jiann-Ching Guey, Hsinchu (TW); Jung-Fu Cheng, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,823

(22) Filed: Apr. 6, 2023

(65) Prior Publication Data

US 2023/0300765 A1 Sep. 21, 2023

Related U.S. Application Data

(63) Continuation of application No. 17/159,278, filed on Jan. 27, 2021, now Pat. No. 11,627,545, which is a
(Continued)

(51) Int. Cl.
*H04W 56/00* (2009.01)
*H04J 11/00* (2006.01)
(Continued)

(52) U.S. Cl.
CPC ........... *H04W 56/002* (2013.01); *H04J 11/00* (2013.01); *H04L 5/0057* (2013.01);
(Continued)

(58) Field of Classification Search
CPC ............ H04W 56/002; H04W 56/001; H04W 56/0035; H04W 72/044; H04J 11/00;
(Continued)

(56) References Cited

U.S. PATENT DOCUMENTS

| 8,675,558 B2 | 3/2014 | Zhu et al. |
| 2003/0202564 A1 | 10/2003 | Ho et al. |

(Continued)

FOREIGN PATENT DOCUMENTS

| WO | 2010147444 A2 | 12/2010 |
| WO | 2011019242 A2 | 2/2011 |

(Continued)

OTHER PUBLICATIONS

3rd Generation Partnership Project. "Consideration on Additional Carrier Type." 3GPP TSG RAN WG1 Meeting #66, R1-112475, Athens, Greece, Aug. 22-26, 2011.
(Continued)

*Primary Examiner* — Kwang B Yao
*Assistant Examiner* — Syed M Bokhari

(57) ABSTRACT

The scheduling flexibility of CSI reference signals enables time and frequency synchronization using multiple non-zero CSI-RSs transmitted in the same subframe, or using CSI-RSs transmitted in the same subframe with other synchronization signals. Also, multiple synchronization signals may be scheduled in the same subframe to enable fine time and frequency synchronization without cell-specific reference signals.

20 Claims, 15 Drawing Sheets

Related U.S. Application Data continuation of application No. 16/450,190, filed on Jun. 24, 2019, now Pat. No. 10,952,172, which is a continuation of application No. 14/827,939, filed on Aug. 17, 2015, now Pat. No. 10,383,077, which is a continuation of application No. 13/470,445, filed on May 14, 2012, now Pat. No. 9,144,045.

(60) Provisional application No. 61/544,190, filed on Oct. 6, 2011.

(51) Int. Cl.
*H04L 5/00* (2006.01)
*H04W 72/044* (2023.01)
*H04L 27/26* (2006.01)

(52) U.S. Cl.
CPC ......... *H04L 5/0094* (2013.01); *H04W 56/001* (2013.01); *H04W 56/0035* (2013.01); *H04W 72/044* (2013.01); *H04J 2011/0096* (2013.01); *H04L 5/0023* (2013.01); *H04L 27/2662* (2013.01)

(58) Field of Classification Search
CPC ............ H04J 2011/0096; H04L 5/0057; H04L 5/0094; H04L 5/0023; H04L 27/2662
USPC ...................................................... 370/330
See application file for complete search history.

(56) References Cited

U.S. PATENT DOCUMENTS

| | | | |
|---|---|---|---|
| 2010/0135257 A1 | 6/2010 | Higuchi et al. | |
| 2011/0170435 A1 | 7/2011 | Kim et al. | |
| 2011/0235743 A1* | 9/2011 | Lee | H04L 5/0053 375/295 |
| 2011/0244877 A1* | 10/2011 | Farajidana | H04L 5/0073 455/452.2 |
| 2011/0274077 A1 | 11/2011 | Yamada et al. | |
| 2012/0099565 A1 | 4/2012 | Kim et al. | |
| 2012/0120905 A1 | 5/2012 | Ko et al. | |
| 2012/0176965 A1 | 7/2012 | Zhu et al. | |
| 2012/0220286 A1 | 8/2012 | Chen et al. | |
| 2013/0044707 A1 | 2/2013 | Chen | |
| 2013/0142156 A1 | 6/2013 | Mazzarese et al. | |
| 2013/0229953 A1 | 9/2013 | Nam et al. | |
| 2014/0205035 A1 | 7/2014 | Ko et al. | |

FOREIGN PATENT DOCUMENTS

| | | |
|---|---|---|
| WO | 2011034340 A2 | 3/2011 |
| WO | 2011044530 A2 | 4/2011 |
| WO | 2011119005 A2 | 9/2011 |

OTHER PUBLICATIONS

3rd Generation Partnership Project. "On Time and Frequency Synchronization on Additional Carrier Types." 3GPP TSG RAN WG1 Meeting #66bis, R1-112926, Zhuhai, China, Oct. 10-14, 2011.

Ericsson, et al.: "Further details on design principles for additional carrier types;" 3GPP draft; TSG-RAN WG1#67; R1-113675; Nov. 8, 2011.

* cited by examiner

▓ SUBFRAME CONTAINING TWO CONFIGURATIONS, USED TO ESTIMATE DOPPLER

▓ SUBFRAME CONTAINING ONE CONFIGURATION

▓ SUBFRAME CONTAINING CSI-RS AND SSS
▓ SUBFRAME CONTAINING ONLY PSS
▓ SUBFRAME CONTAINING ONLY SSS

▓ SUBFRAME CONTAINING SSS1 AND PSS IN SLOT 1 AND SSS2 IN SLOT 2
▨ SUBFRAME CONTAINING ONLY PSS IN SLOT 1

TIME AND FREQUENCY SYNCHRONIZATION

CROSS-REFERENCE TO RELATED APPLICATIONS

This application is a continuation of U.S. patent application Ser. No. 17/159,278, filed Jan. 27, 2021, now U.S. Pat. No. 11,627,545, which is a continuation of U.S. patent application Ser. No. 16/450,190, filed Jun. 24, 2019, now U.S. Pat. No. 10,952,172, which is a continuation of U.S. patent application Ser. No. 14/827,939, filed Aug. 17, 2015, now U.S. Pat. No. 10,383,077, which is a continuation of U.S. patent application Ser. No. 13/470,445, filed May 14, 2012, now U.S. Pat. No. 9,144,045, which claims the benefit of U.S. Provisional Application No. 61/544,190, filed Oct. 6, 2011, the disclosures of which are fully incorporated herein by reference.

BACKGROUND

Long Term Evolution (LTE) is a technology developed by the 3rd Generation Partnership Project (3GPP) for mobile broadband wireless communication. In LTE, transmissions from the base stations (referred to as Evolved Node Bs (eNBs)) to user terminals (referred to as user equipment (UE)) are sent using orthogonal frequency division multiplexing (OFDM). In OFDM systems, such as LTE, a wideband carrier is divided into multiple subcarriers. The basic unit of transmission in LTE is a resource block which, for most configurations, comprises twelve 15 kHz subcarriers in the frequency domain and one 0.5 millisecond slot (seven OFDM symbols) in the time domain.

In order to demodulate transmissions on the downlink, a user terminal first has to synchronize in time and frequency with the base station. When the user terminal initially connects to the cell, it performs a cell search operation. During the cell search operation, the user terminal performs coarse time and frequency synchronization with the base station and determines the cell identity for the cell served by the base station. To assist the user terminal in the cell search procedure, the base station transmits two synchronization signals on the downlink: the primary synchronization signal (PSS) and the second synchronization signal (SSS). The PSS and SSS span only the six resource blocks in the center of the transmitted signal. The possible sequences representing different cell IDs are known a priori to the user terminal, and the user terminal finds the cell ID by correlating the transmitted signal with each of the candidate sequences. After acquiring coarse time and frequency synchronization, during the cell search procedure, the user terminal reads the system information from the broadcast channel. The system information includes, among other things, information about the uplink and downlink cell bandwidth and the common reference symbol (CRS) configuration. The user terminal uses the CRS to demodulate information received on the downlink. The CRS is also used to maintain time and frequency synchronization with the base station.

The CRS spans the entire bandwidth of the signal being transmitted by the base station and occurs in four or six OFDM symbols in every subframe (one millisecond). Therefore, the CRS is useful for both time and frequency synchronization. However, the CRS may lead to energy inefficient transmission because the CRS is transmitted in every subframe, even when no data is being transmitted. Further, the interference between CRS signals from different cells, and the limitation on the number of transmission modes for control channels that use the CRS for channel estimation, limit the capacity for control channels in LTE. Therefore, it would be desirable to reduce or eliminate reliance on CRS for time and frequency synchronization.

SUMMARY

The present invention provides methods and apparatus for maintaining time and frequency synchronization with a base station. In exemplary embodiments of the present invention, the scheduling flexibility of channel state information reference signals (CSI-RSs) is used to enable time and frequency synchronization based on multiple non-zero power CSI-RSs transmitted in the same subframe, or CSI-RSs in combination with other synchronization signals transmitted in the same subframe. The performance level achieved is similar to synchronization based on cell specific reference signals (CRSs) but with lower overhead.

Exemplary embodiments of the invention comprise methods of transmitting reference signals used for time and frequency synchronization. In one exemplary embodiment, the method comprises transmitting a first CSI reference signal in a first slot of a plurality of subframes in accordance with a first configuration of transmission resources; transmitting a second CSI reference signal in a second slot of one or more of the plurality of subframes in accordance with a second configuration of transmission resources; and transmitting the first and second CSI reference signals from the same antenna port in at least one of the plurality of subframes.

In another exemplary embodiment, the method comprises transmitting a synchronization signal in a first slot of a plurality of subframes; transmitting a CSI reference signal in a second slot of one or more of the plurality of subframes; and transmitting the CSI reference signal and the synchronization signal over the same antenna port in at least one of the plurality of subframes.

In another exemplary embodiment, the method comprises transmitting a primary synchronization signal in first and second subframes of a frame; transmitting a first secondary synchronization signal in a first slot of the first subframe over a first antenna port; and transmitting a second secondary synchronization signal a second slot of the first subframe over the first antenna port.

Other embodiments of the invention comprise a base station configured to transmit reference signals to enable time and frequency synchronization by a user terminal. In one exemplary embodiment, the base station comprises a transceiver circuit configured to communicate with a user terminal over a wireless communicate channel; and a control circuit providing reference signals to the transceiver circuit for transmission to a user terminal. The control circuit is configured to transmit a first CSI reference signal in a first slot of a plurality of subframes in accordance with a first configuration of transmission resources; transmit a second CSI reference signal in a second slot of one or more of the plurality of subframes in accordance with a second configuration of transmission resources; and transmit the first and second CSI reference signals from the same antenna port in at least one of the plurality of subframes.

In another exemplary embodiment, the base station comprises a transceiver circuit configured to communicate with a user terminal over a wireless communicate channel; and a control circuit providing reference signals to the transceiver circuit for transmission to the user terminal. The control circuit is configured to transmit a synchronization signal in a first slot of a plurality of subframes; transmit a CSI reference signal in a second slot of one or more of the plurality of subframes; and transmit the CSI reference signal and the synchronization signal over the same antenna port in at least one of the plurality of subframes.

In another exemplary embodiment, the base station comprises a transceiver circuit configured to communicate with a user terminal over a wireless communicate channel; and a control circuit providing reference signals to the transceiver circuit for transmission to the user terminal. The control circuit is configured to transmit a primary synchronization signal in first and second subframes of a frame; transmit a first secondary synchronization signal in a first slot of the subframe over a first antenna port; and transmit a second secondary synchronization signal in a second slot of the first subframe over the first antenna port; and transmit the first and second secondary synchronization signals from the same antenna port.

Exemplary embodiments of the invention also comprise methods of synchronization performed by a user terminal. In one exemplary embodiment, the method comprises receiving a first CSI reference signal transmitted in a first slot of a plurality of subframes in accordance with a first configuration of transmission resources; receiving a second CSI reference signal transmitted in a second slot of one or more of the plurality of subframes in accordance with a second configuration of transmission resources; receiving the first and second CSI reference signals on the same antenna port in at least one of the plurality of subframes; and synchronizing with the OFDM system using the first and second CSI reference signals.

In another exemplary embodiment, the method comprises receiving a synchronization signal in a first slot of a plurality of subframes over a first antenna port; receiving a CSI reference signal in a second slot of one or more of the plurality of subframes; over the first antenna port; and synchronizing with the OFDM system using the CSI reference signal and synchronization signal.

In another exemplary embodiment, the method comprises receiving a primary synchronization signal that is transmitted in a first subframe of a frame and a second subframe of the frame; receiving a first secondary synchronization signal that is transmitted over a first antenna port in a first slot of the first subframe; receiving a second secondary synchronization signal that is transmitted over the first antenna port in a second slot of the first subframe; and synchronizing with the OFDM system using the first and second synchronization signals.

Other embodiments of the invention comprise a user terminal configured to synchronize with a base station. In one exemplary embodiment, the user terminal comprises a transceiver circuit configured to communicate with a base station over a wireless communicate channel; and a control circuit for synchronizing with the OFDM system. The control circuit is configured to receive a first CSI reference signal that is transmitted in a first slot of one or more subframes in accordance with a first configuration of transmission resources; receive a second CSI reference signal that is transmitted in a second slot of one or more of the plurality of subframes in accordance with a second configuration of transmission resources; receive the first and second CSI reference signals on the same antenna port in at least one of the plurality of subframes; and synchronize with the OFDM system using the first and second CSI reference signals.

In one exemplary embodiment, the user terminal comprises a transceiver circuit configured to communicate with a base station over a wireless communicate channel; and a control circuit for synchronizing with the OFDM system. The control circuit is configured to receive a synchronization signal that is transmitted in a first slot of a plurality of subframes over a first antenna port; receive a CSI reference signal that is transmitted in a second slot of one or more of the plurality of subframes over the first antenna port; and synchronize with the OFDM system using the CSI reference signal and synchronization signal.

In one exemplary embodiment, the user terminal comprises a transceiver circuit configured to communicate with a base station over a wireless communicate channel; and a control circuit for synchronizing with the OFDM system. The control circuit is configured to receive a primary synchronization signal that is transmitted in a first subframe of a frame and a second subframe of the frame; receive a first secondary synchronization signal that is transmitted over a first antenna port in a first slot of the first subframe; receive a second secondary synchronization signal that is transmitted over the first antenna port in a second slot of the first subframe; and synchronize with the OFDM system using the first and second sets of synchronization signals.

DETAILED DESCRIPTION

Figure 1:
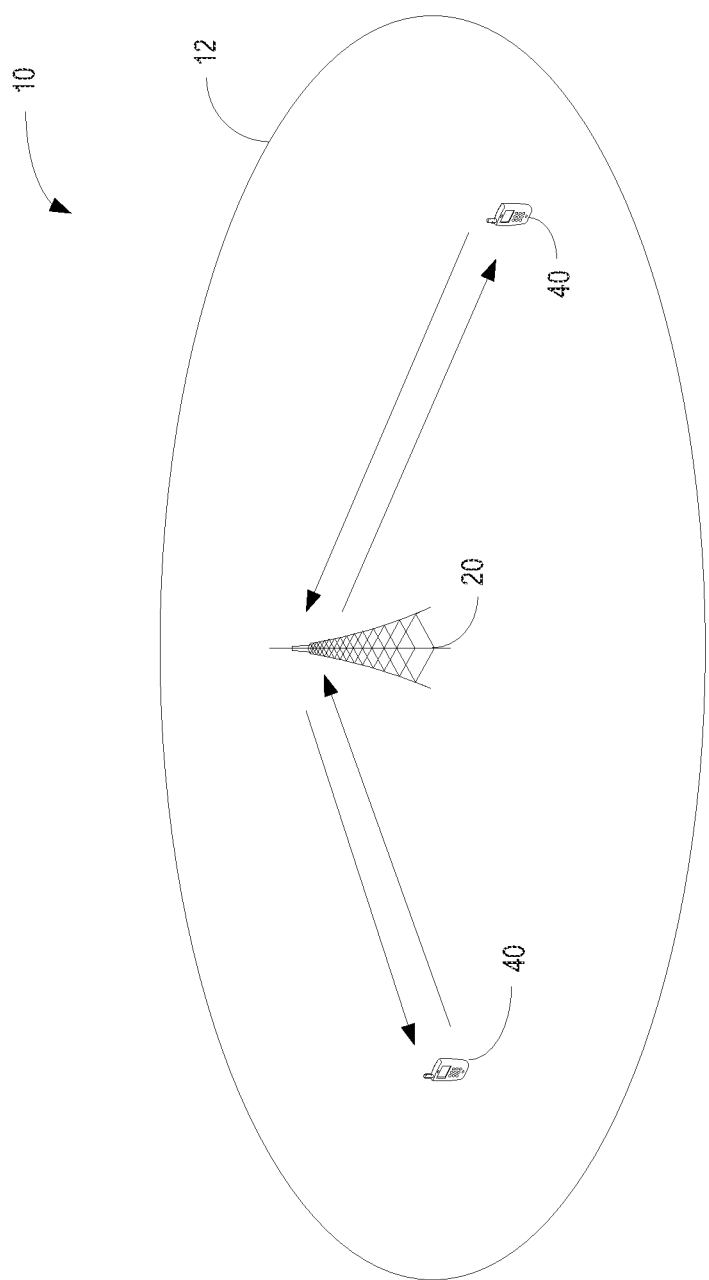
FIG. 1 illustrates an exemplary communication network according to exemplary embodiments as described herein.

Turning now to the drawings, FIG. 1 illustrates an exemplary communication network 10 according to one exemplary embodiment of the present invention. The communication network 10 comprises a plurality of cells 12, though only one cell 12 is shown in FIG. 1. A base station 20 within each cell 12 communicates with the user terminals 40 within each cell 12. The base station 20 transmits data to the user terminals 40 over a downlink channel for downlink communications, and receives data from the user terminals 40 over an uplink channel for uplink communications.

For illustrative purposes, an exemplary embodiment of the present invention will be described in the context of a Long Term Evolution (LTE) system. Those skilled in the art will appreciate, however, that the present invention is more generally applicable to other OFDM systems, such as WiMAX (IEEE 802.16) systems.

Figure 2:
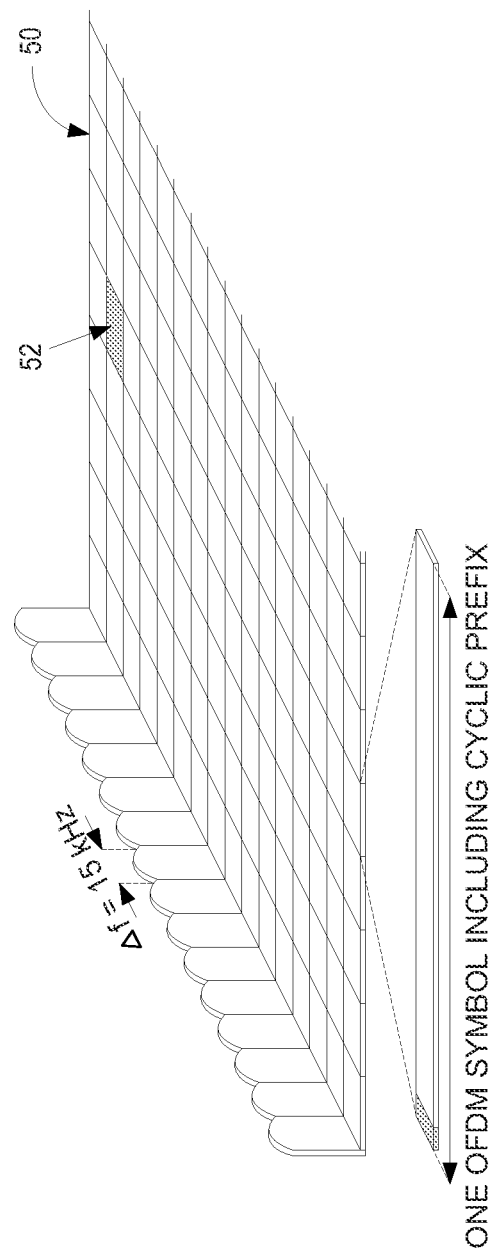
FIG. 2 illustrates an exemplary time frequency grid for an OFDM system according to one exemplary embodiment.

LTE uses Orthogonal Frequency Division Multiplexing (OFDM) in the downlink and Discrete Fourier Transform (DFT) spread OFDM in the uplink. The available radio resources in LTE systems can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element 52. A resource element 52 comprises one OFDM subcarrier during one OFDM symbol interval.

Figure 3:
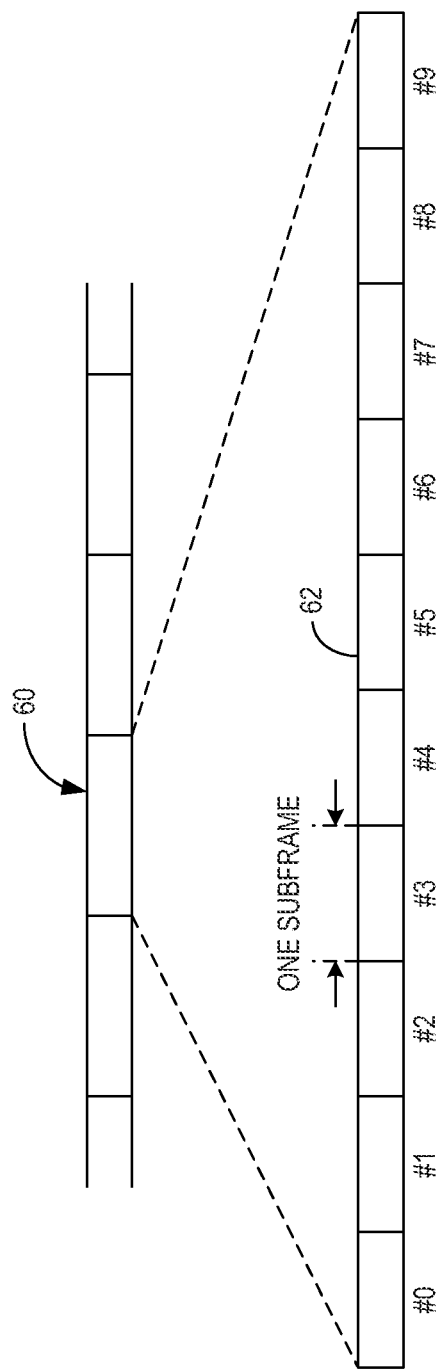
FIG. 3 illustrates an exemplary radio frame for an OFDM system according to one exemplary embodiment.

As shown in FIG. 3, the downlink transmissions are organized into 10 ms radio frames 60. Each radio frame comprises ten equally-sized subframes 62, which for purposes of discussion are numbered 0-9.

Resources for the downlink transmissions are allocated in units called resource blocks (RBs). Each resource block spans twelve subcarriers (which may be adjacent or distributed across the frequency spectrum) and one 0.5 ms slot (one half of one subframe). Thus, a resource block comprises 84 resource elements for the normal cyclic prefix. The term "resource block pair" refers to two consecutive resource blocks occupying an entire 1 ms subframe.

For multiple-input, multiple-output (MIMO) operations, signals are transmitted from multiple antennas at the base station 20 and received by multiple antennas at the user terminal 40. It should be noted that transmissions from the base station are sent from antenna ports. It should also be noted that an antenna port does not necessarily correspond to a physical antenna. Rather, an antenna port is a more general concept that encompasses both physical antennas and virtual antennas created using the beam-forming techniques at the transmitter. In current versions of LTE, up to 8 antenna ports are supported.

The radio channel distorts the signals transmitted from the antenna ports. In order to demodulate the signals transmitted by the base station 20, the user terminal 40 relies on reference signals (RSs) that are transmitted on the downlink. The reference signals, and their position in the time frequency grid, are known to the user terminal 40 and can be used to determine channel estimates by measuring the effect of the radio channel on the reference symbols.

Figure 4:
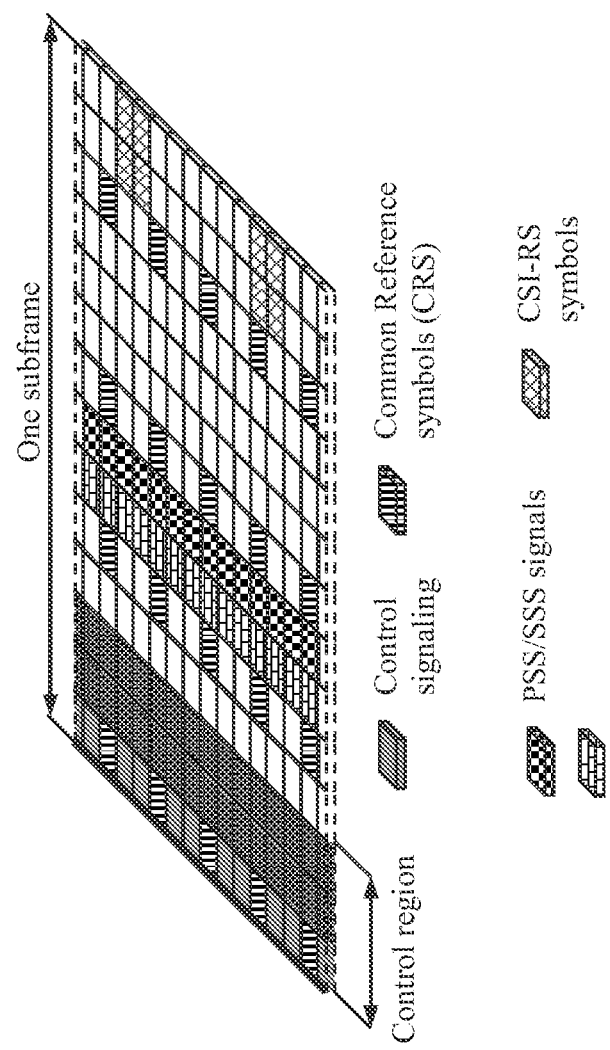
FIG. 4 illustrates various types of reference symbols used in LTE systems.

Reference signals are predefined signals occupying specific resource elements within the downlink time frequency grid. FIG. 4 illustrates some of the reference signals transmitted in LTE systems. LTE uses several different types of downlink reference signals including common reference signals (CRSs), demodulation reference signals (DM-RSs), and channel state information (CSI) reference signals (CSI-RSs).

The CRS is transmitted in every downlink subframe and in every resource block in the frequency domain, thus covering the entire cell bandwidth. The CRS can be used by the user terminal 40 to perform channel estimation for coherent demodulation. The CRS can also be used by the user terminal 40 to acquire channel state information (CSI). Measurements on the CRS may also be used for cell selection and handover decisions.

Demodulation reference signals (DM-RSs), sometimes referred to as user terminal-specific reference signals, are intended for use by a specific user terminal 40 or group of user terminals 40. The DM-RS is therefore transmitted only within the resource blocks used for downlink transmissions to the specific user terminal 40 or group of user terminals 40 on the Physical Downlink Shared Channel (PDSCH).

CSI reference signals are intended for use by user terminals 40 to acquire channel state information in the case when demodulation reference signals are used for channel estimation, such as when non-codebook-based precoding is being utilized. Because DM-RS are precoded along with their associated downlink transmissions, the precoded DM-RS can be used by a receiving device to demodulate and recover transmitted layers without the receiving device being explicitly informed of the specific precoding that is applied on the transmitting side. In such cases, it may still be desirable for the receiving device to signal precoder recommendations to the base station. Because DM-RSs are themselves precoded, they can only be used to estimate the equivalent channel experienced by the precoded layer (including any precoding), not the physical channel. As a result, in such scenarios, terminal-specific CSI-RSs may be used for channel estimation as part of the procedure for generating CSI. For example, CSI-RS are used by UEs to generate CSI when transmission mode 9 (which, as defined in Release 10 of LTE, provides non-codebook-based precoding for transmissions of up to eight layers) is utilized in an LTE network. The CSI-RS has a significantly lower time/frequency density than the CRS and is therefore more efficient in the case of a reference signal only targeting CSI. Additionally, because the time/frequency allocation of CSI-RSs can be selectively configured, using CSI-RSs for CSI generation in such scenarios can result in significant flexibility.

A cell 12 can be configured with 1, 2, 4, or 8 CSI reference signals. The CSI reference signal configuration depends on the number of CSI reference signals used within a cell and may be different for different cells. Within a resource block pair, there are 40 possible positions for the reference symbols of the CSI reference signal. The period of the CSI reference signals is also configurable with a maximum frequency of once every 5 milliseconds to a minimum frequency of once every 160 milliseconds.

In addition to the reference signals described above, the base station 20 transmits a primary synchronization signal (PSS) and a secondary synchronization signal (SSS) to facilitate time and frequency synchronization for cell search operations. For frequency division duplexing (FDD) operations, the PSS and SSS are transmitted within the last 2 OFDM symbols in the first slot of subframes 0 and 5. For time division duplexing (TDD) operations, the SSS is transmitted in the last OFDM symbol of subframes 0 and 5, and the PSS is transmitted in the third OFDM symbol of subframes 1 and 6. The PSS and SSS are transmitted in the center of the system bandwidth, occupying 6 resource blocks in the frequency domain. As previously noted, the configuration of the PSS and SSS allow coarse time and frequency synchronization. The CRS is used for fine tuning both time and frequency synchronization. One disadvantage of this approach is that the high density of the CRS results in high overhead.

In exemplary embodiments of the present invention, the CSI reference signals are configured in a manner so that multiple CSI reference signals, or CSI reference signals in combination with the PSS and SSS may be used to maintain time and frequency synchronization with performance approximating synchronization using the CRS, but in a more efficient manner.

In general, the synchronization signals are transmitted by the base station 20 at predetermined times (e.g., in a specific subframe and/or slot within every frame) and each carry a value or values chosen from a known set. Because these value or values are chosen from a known set, the value(s) can be recognized by a receiving device as being part of a synchronization signal (and/or as being a particular type of synchronization signal) even if the receiving device is not yet aware of the frame timing being used in the relevant cell 12 (e.g., an unsynchronized user terminal 40). The receiving device may then use the timing of the received synchronization signal(s) to determine the frame timing being used in the relevant cell 12, thereby allowing the receiving device to synchronize with cell 12. In particular embodiments, the synchronization signals may also convey additional information based on the specific value(s) selected.

For example, in particular embodiments, each cell 12 is associated with one of 504 different physical-layer cell identities. The 504 different physical-layer cell identities are divided into 168 different cell-identity groups, each containing three cell identities. In such embodiments, base station 20 transmits a PSS that comprises one of three predetermined Zadoff-Chu (ZC) sequences, with the specific ZC sequence transmitted identifying, from within a particular cell-identity group, the cell identity for the associated cell 12. In such embodiments, base station 20 also transmits a pair of SSSs (SSS1 and SSS2) every frame, with each SSS being transmitted during a predetermined subframe within the frame. SSS1 and SSS2 are both generated from one of 168 predetermined pairs of rn-sequences (X and Y), with X and Y being frequency interleaved in the relevant SSS. The same pair of rn-sequences, X and Y, are used to generate both SSS1 and SSS2, but SSS2 has X and Y swapped in the frequency domain relative to SSS1. Consequently, in embodiments of this type, a user terminal 40 may be able to identify one of 504 different physical-layer cell identities associated with cell 12 by using SSS1 or SSS2 to determine a cell-identity group for cell 12 and using PSS to identify a particular cell identity in that cell-identity group. Furthermore, because the relevant pair of rn-sequences is frequency swapped between SSS1 and SSS2, the user terminal 40 is able to determine whether it has received a valid SSS1 or a valid SSS2 based on the frequency mapping of the transmitted X and Y sequences. As a result, in such embodiments, the user terminal 40 may be able to synchronize with cell 12 after receiving PSS and only one of SS1 and SS2.

Figure 5:
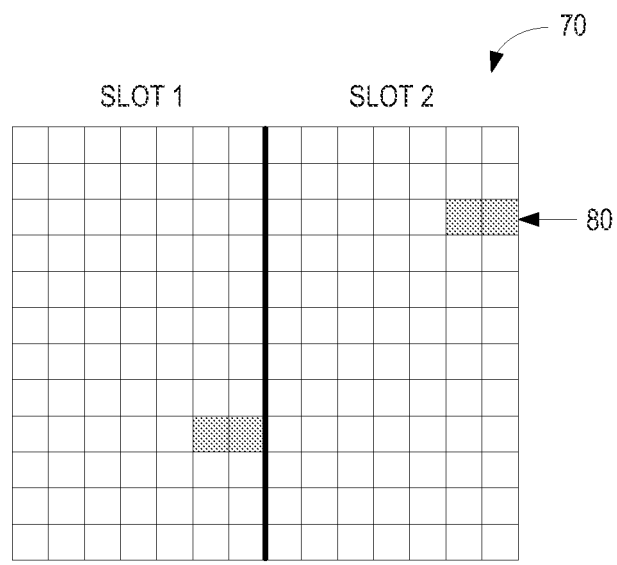
FIG. 5 illustrates an exemplary configuration of CSI reference symbols according to one exemplary embodiment.

FIG. 5 illustrates a resource block 70 in an exemplary embodiment of the invention using CSI reference signals for time and frequency synchronization. In this embodiment, the two CSI references signals 80 are transmitted in the first and second slots respectively of the same subframe, and are offset in frequency. The CSI reference signals may be transmitted from a single base station 20 in a cell 12, or from different or multiple transmission points within the cell 12. A first CSI-RS is transmitted in the last two symbols of the first slot of a subframe and a second CSI-RS is transmitted in the last two symbols of a second slot of the same subframe. Thus, the CSI-RSs in the first and second slots are separated by 0.5 ms in the time domain. The first and second CSI-RSs may be transmitted on different subcarriers as shown in FIG. 5 to provide greater density in the frequency domain when the two transmissions are considered together.

The two CSI-RS signals shown in FIG. 5 are transmitted from the same antenna port. Because the same antenna port is used to transmit the CSI references signals, it is ensured that the CSI-RSs are transmitted from the same physical antenna and that the channel measured using the two CSI-RSs is the same. Hence, performing measurements on these two different CSI-RSs therefore can be used to assist synchronization.

It may be noted that conventional systems enabled multiple CSI-RS configurations within the same cell 12. However, conventional systems did not require that the same antenna port be used. Therefore, the user terminal 40 could not make any assumption on the relation between the antenna ports of different CSI-RS configurations and could not use these reference symbols for synchronization purposes. By contrast, particular embodiments of the present invention may enable time and frequency synchronization by using two differently configured CSI reference signals transmitted in different slots of the same subframes over the same antenna port.

Figure 6:
FIG. 6 illustrates the frame timing of the CSI reference symbols according to one exemplary embodiment.

As shown in FIG. 6, the periodicity of the two CSI-RSs may be configured independently. In the example shown in FIG. 6, the first CSI-RS is transmitted with a periodicity of 5 ms, i.e., 5 subframes. The second CSI-RS is transmitted with a periodicity of 20 ms, i.e., 20 subframes. The periods are aligned so that CSI-RSs used for synchronization are transmitted in the both the first and second slots every 20 ms. The lower repetition frequency for the CSI-RS transmitted in the second slot reduces the overhead but still enables fine tuning of the synchronization using the CSI-RSs transmitted every 20 ms.

In one exemplary embodiment, the CSI-RS transmitted in the first slot is used for quality estimation and synchronization, and the CSI-RS transmitted in the second slot is used only for synchronization.

Figure 7:
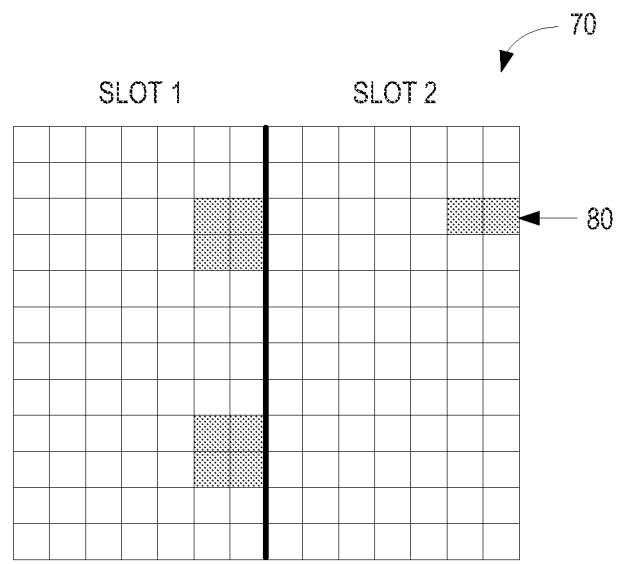
FIG. 7 illustrates another exemplary configuration of CSI reference symbols according to one embodiment of the invention.

FIG. 7 illustrates a resource block 70 in another exemplary embodiment. In this embodiment, a larger number of CSI-RSs 80 are transmitted in the first slot, and a fewer number of CSI-RSs are transmitted in the second slot in order to reduce overhead. As shown in FIG. 7, eight resource elements are allocated in the first slot for transmission of four CSI-RSs from four different antenna ports. Two resource elements are allocated in the second slot for transmission of a single CSI-RS. The CSI-RS in the second slot is transmitted from the same antenna port used for one of the CSI-RSs in the first slot to enable synchronization. The CSI-RSs in the first slot may be transmitted at a higher repetition frequency and used for both channel quality estimation and synchronization. The CSI-RSs in the second slot may be transmitted at a lower repetition frequency, and are used primarily for synchronization.

Figure 8:
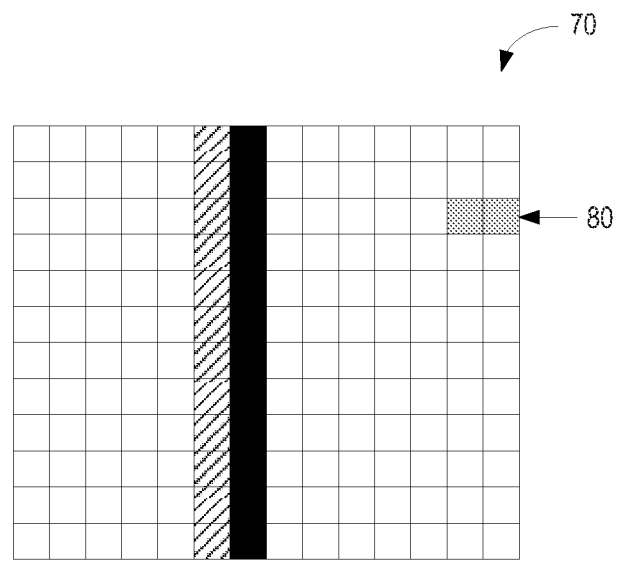
FIG. 8 illustrates an exemplary configuration of the PSS, SSS, and CSI reference symbols according to one embodiment of the invention.

FIG. 8 illustrates a resource block 70 in another exemplary embodiment where a CSI-RS is used in combination with the PSS and SSS to perform time and frequency synchronization. In this embodiment, the CSI-RS is transmitted in the same subframe as the PSS and SSS. As noted previously, the PSS and SSS appear in the six resource blocks in the center of the bandwidth. In the embodiment shown in FIG. 8, the PSS occupies the last symbol of the first slot in the subframe, and the SSS occupies the second last symbol in the first slot. The CSI-RS, in contrast to the PSS and SSS, spans the entire bandwidth and is transmitted in the last two symbols of the second slot. The antenna port used by at least one CSI-RS in the second slot is the same as the antenna port used for the PSS and SSS. The periodicity of the CSI-RS may be every 5 ms or some multiple of 5 ms. The PSS and SSS have good properties for time synchronizations. The PSS and SSS, along with the CSI-RS in the second slot, will yield good performance for frequency synchronization.

Figure 9:
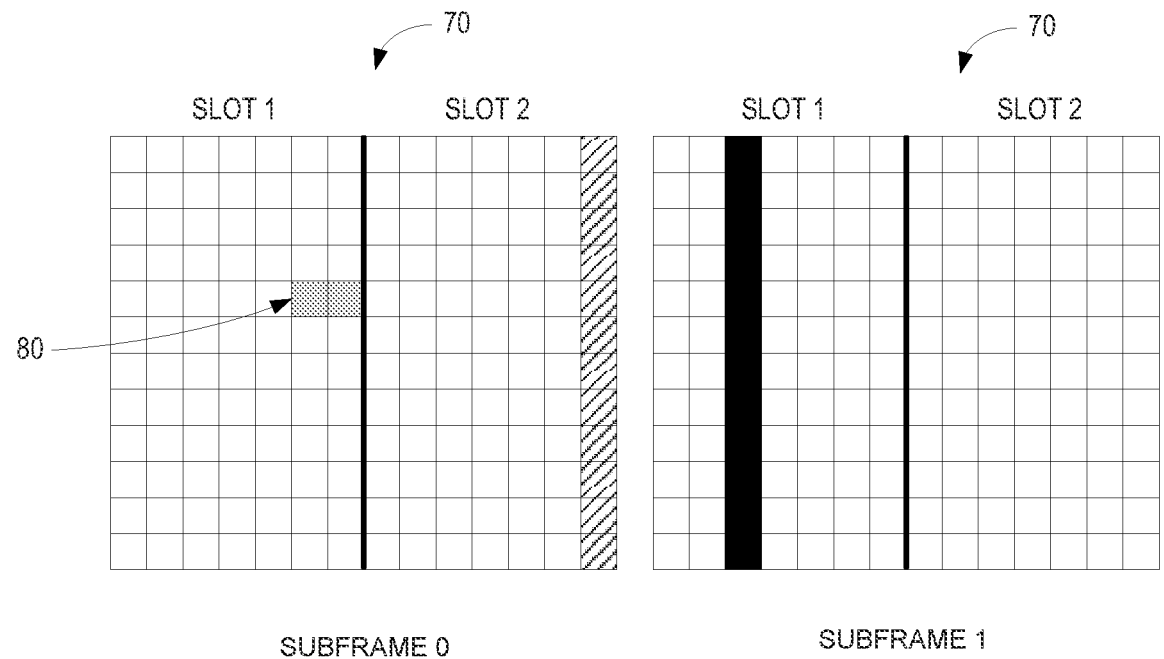
FIG. 9 illustrates another configuration of the PSS, SSS, and CSI reference symbols according to another embodiment of the invention.

FIG. 9 illustrates two resource blocks 70 in another embodiment using the CSI-RS in combination with the PSS and SSS for time and frequency synchronization. In LTE systems using time division duplexing (TDD), the PSS and SSS are not always transmitted in the same subframe. For example, the SSS may be transmitted in the last symbol of subframes 0 and 5 while the PSS is transmitted in the third symbol of subframes 1 and 6. In this embodiment, the CSI-RS may be transmitted in the same subframes as the SSS. In the embodiment shown in FIG. 9, the CSI-RS is transmitted in the last two symbols of the first slot in the same subframes as the SSS. The antenna port used for the CSI-RS is the same as the antenna port used for the SSS and PSS.

Figure 10:
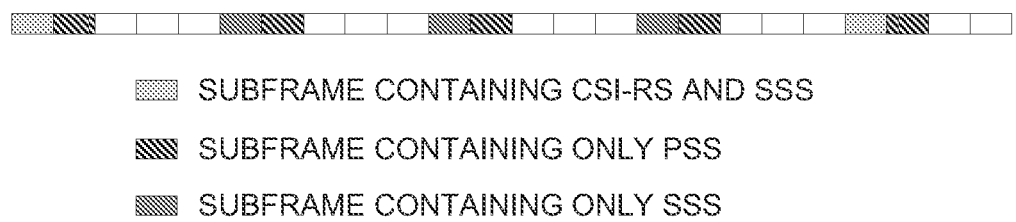
FIG. 10 illustrates the frame timing for the PSS, SSS, and CSI reference symbols according to one embodiment.

FIG. 10 illustrates the timing of the CSI-RS, PSS, and SSS according to one embodiment. As shown in FIG. 10, the PSS and SSS are transmitted in consecutive subframes every five ms. The CSI-RS is transmitted in the same subframe as the SSS every 20 ms.

For frequency division duplexing (FDD) in LTE Release 10 and earlier releases, the SSS and PSS appear in successive OFDM symbols once every five milliseconds. The SSS signal alternates between two different signals, denoted SSS1 and SSS2. In another exemplary embodiment of the invention (e.g. FIG. 11), the configuration of the PSS and SSS signals may be modified to enable fine time and frequency synchronization.

Figure 11:
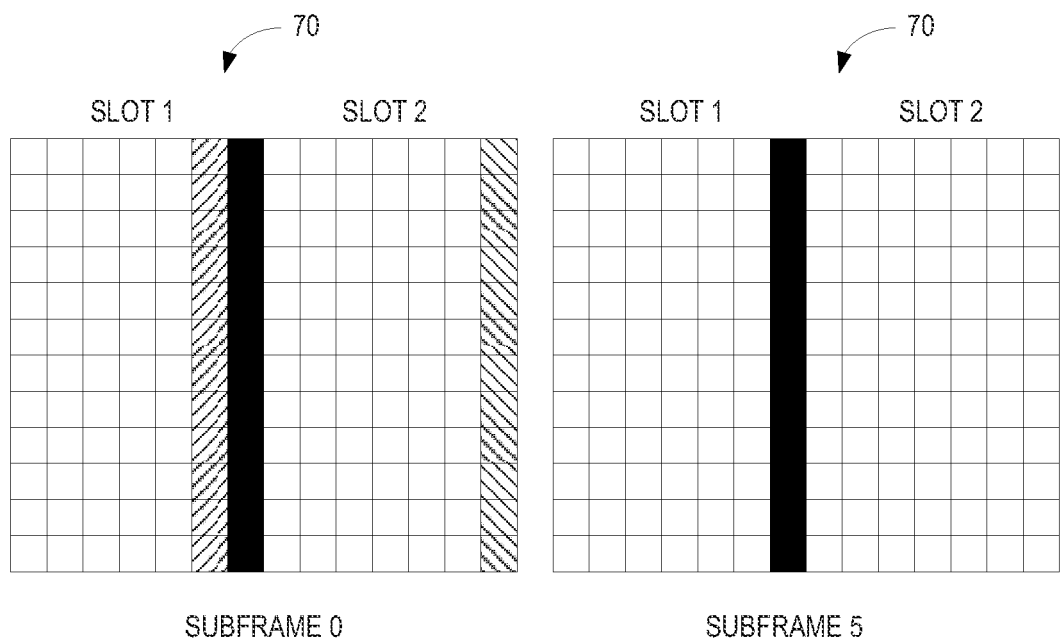
FIG. 11 illustrates an exemplary configuration of the PSS and SSS according to one exemplary embodiment of the invention.

FIG. 11 illustrates two resource blocks 70 in a radio frame 60 according to another exemplary embodiment. In this embodiment, the PSS is transmitted in the last symbol of the first slot. SSS1 is transmitted on the second last symbol in the first slot of the subframe, and SSS2 is transmitted in the last symbol of the second slot of the same subframe. The SSS2 signal is transmitted from the same antenna port as the SSS1. The transmission of SSS2 in the second slot of the subframe will improve performance of frequency synchronization.

Figure 12:
FIG. 12 illustrates the frame timing of the PSS and SSS according to one exemplary embodiment.

FIG. 12 illustrates the timing of the synchronization signals in the embodiment shown in FIG. 11. As shown in FIG. 12, the PSS is transmitted every five subframes, while SSS1 and SSS2 are transmitted every ten subframes. Those skilled in the art will appreciate that the frequency of the SSS1 and SSS2 signals could be varied.

The two SSS sequences could also be transmitted in the same subframe for the TDD operations. In this case, one of the SSS signals could be transmitted at the end of slot 1 and the other transmitted at the end of slot 2. Alternately, because the TDD case already has a 3 OFDM symbol gap between the SSS and the PSS, the gap can be made larger to improve frequency estimation performance by transmitting the SSS2 symbols earlier.

Different base stations 20 may use different subframe offsets to schedule the PSS and SSS, such that the subframe numbering is the same for all base stations, but the PSS and SSS appear in different subframes for each base station. This staggered transmission alleviates interference between the base stations 20 for the PSS signal and significantly improves the performance when the PSS is used for time and frequency synchronization. For example, if five base stations 20 each use five different subframe offsets in a synchronized system having three distinct PSS sequences, an effective reuse factor of 15 can be achieved. The subframe number that carries the PSS and SSS signals for any base station 20 can be signaled to the user terminal 60 by the base station 20 in the Physical Broadcast Channel (PBCH) message.

Figure 13:
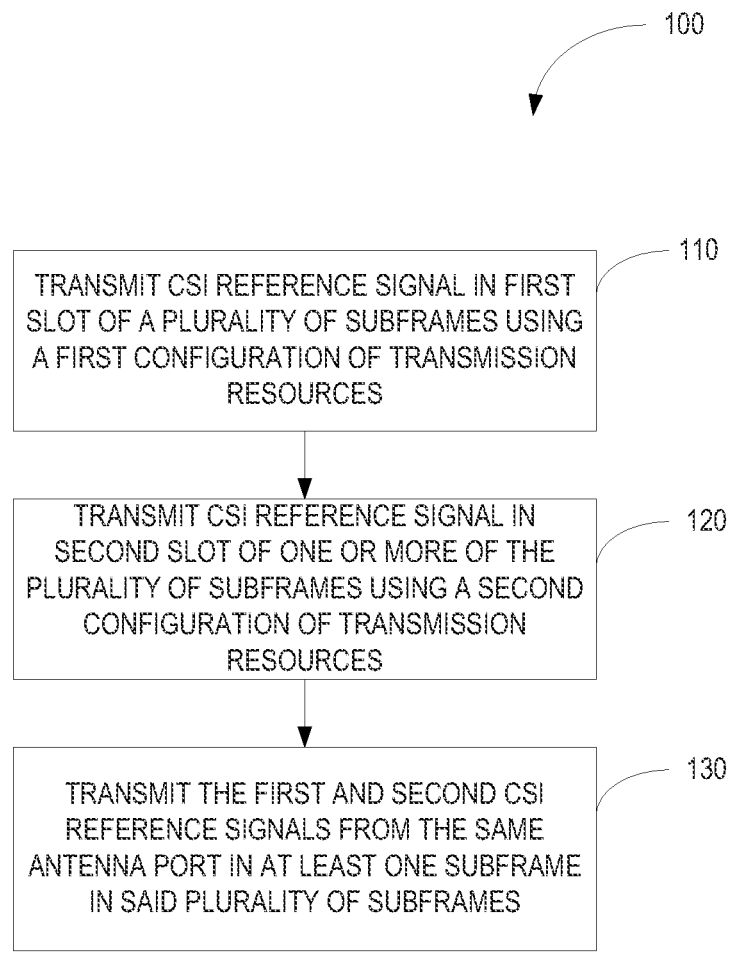
FIG. 13 illustrates an exemplary method of transmitting CSI reference symbols to facilitate time and frequency synchronization.

FIG. 13 illustrates an exemplary method 100 implemented by a base station 20 for transmitting reference signals used for synchronization in an OFDM system. The base station 20 transmits a CSI reference signal in a first slot of a plurality of subframes (block 110). The first CSI signal uses a first configuration of transmission resources. The base station 20 also transmits a second CSI reference signal in a second slot of one or more of the plurality of subframes (block 120). The second CSI reference signal is transmitted using a second configuration of transmission resources. The base station 20 transmits the first and second CSI reference signals using the same antenna port in at least one subframe of the plurality of subframes (block 130).

Figure 14:
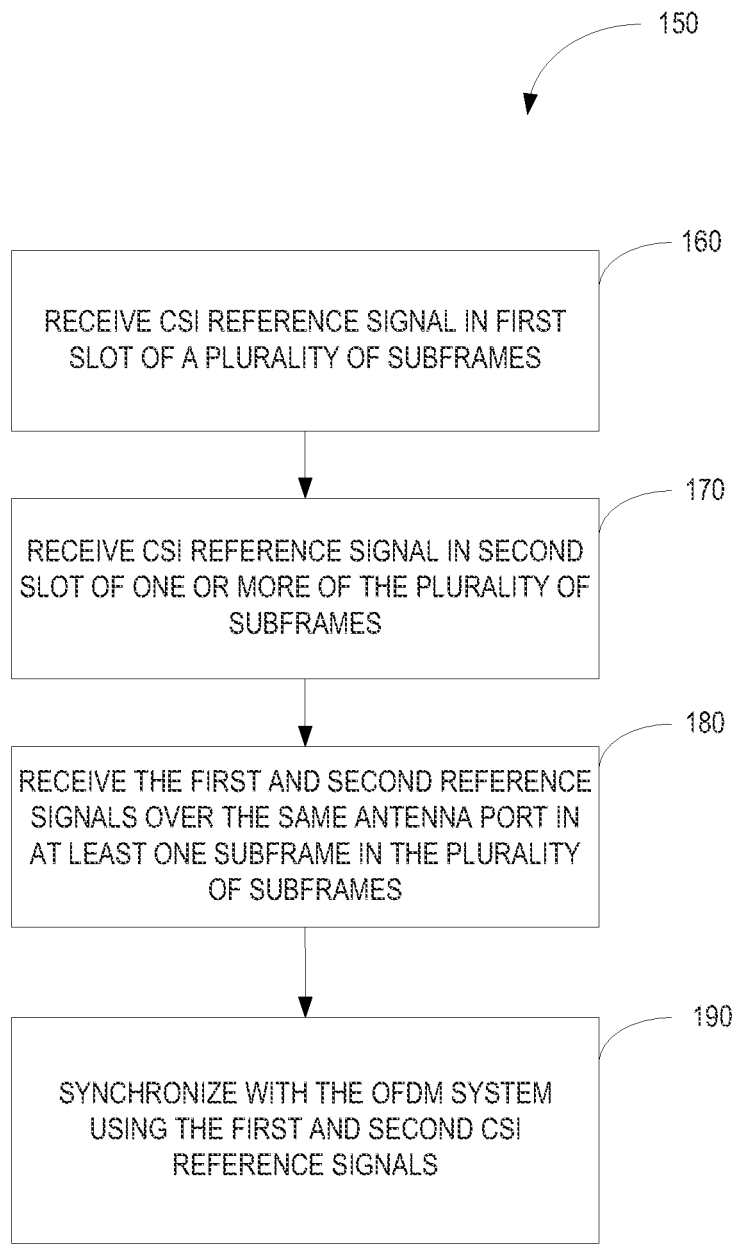
FIG. 14 illustrates an exemplary method of time and frequency synchronization using CSI reference symbols.

FIG. 14 illustrates an exemplary method 150 of time and frequency synchronization implemented by a user terminal 40. The user terminal 40 receives a first reference signal in a first slot of plurality of subframes (block 160). The first reference signal is transmitted using a first configuration of transmission resources. The user terminal 40 also receives a second CSI reference signal in a second slot of one or more of the plurality of subframes (block 170). The second CSI reference signal uses a second configuration of CSI resources. The user terminal 40 receives the first and second reference signals over the same antenna port in at least one subframe in the plurality of subframes (block 180). The user terminal 40 then synchronizes with the OFDM system using the first and second CSI reference signals (block 190).

Figure 15:
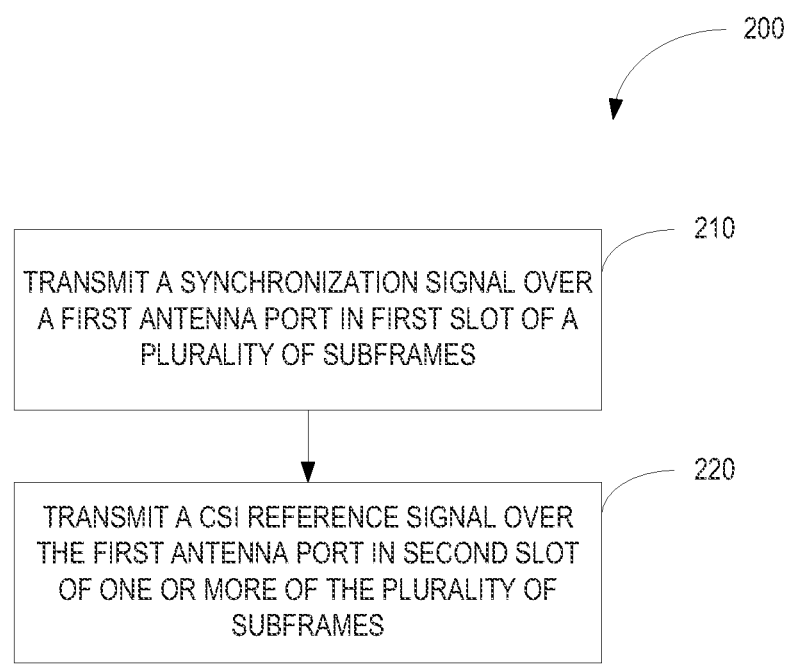
FIG. 15 illustrates an exemplary method of transmitting CSI reference symbols and synchronization signals to facilitate time and frequency synchronization.

FIG. 15 illustrates another exemplary method 200 of transmitting reference signals for synchronization in an OFDM system that is implemented by the base station 20. The base station 20 transmits one or more synchronization signals over a first antenna port in a first slot of a plurality of subframes (block 210). The base station 20 also transmits a CSI reference signal over the first antenna port in a second slot of one or more of the plurality of subframes used for transmission of the synchronization signal (block 220).

Figure 16:
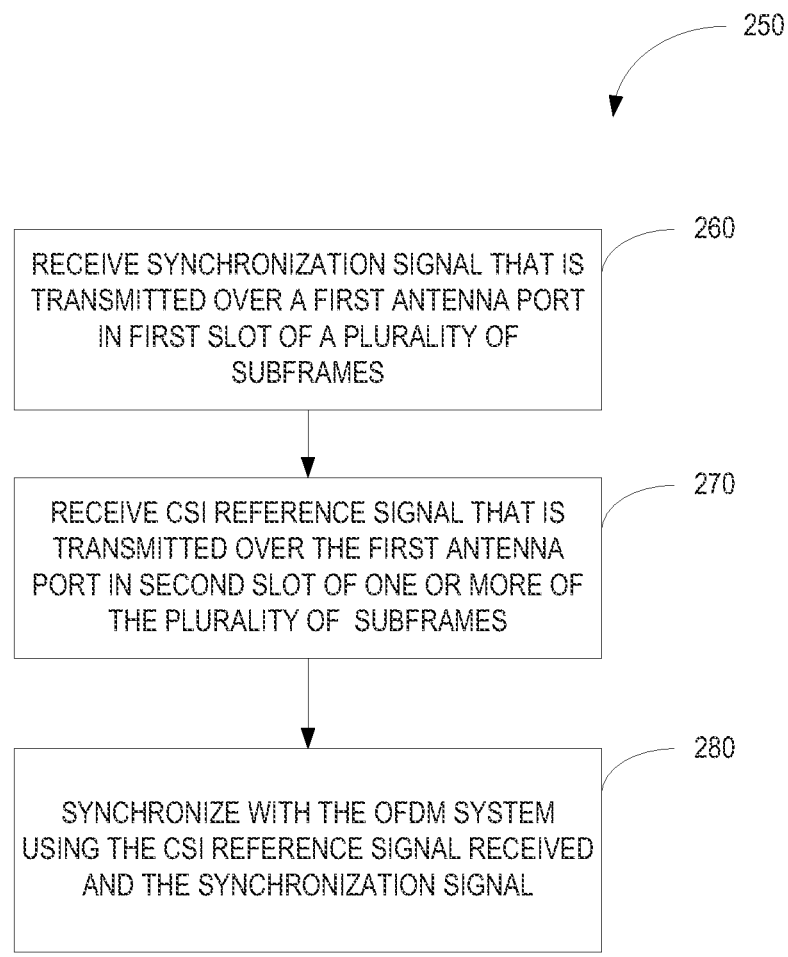
FIG. 16 illustrates an exemplary method of time and frequency synchronization using CSI reference symbols in combination with synchronization signals.

FIG. 16 illustrates an exemplary method 250 of synchronization using synchronization signals in combination with CSI signals implemented in a user terminal 40. The user terminal 40 receives a synchronization signal that is transmitted over a first antenna port in a first slot of a plurality of subframes (block 260). The user terminal 40 also receives a CSI reference signal that is transmitted over the first antenna port in a second slot of one or more of the plurality of subframes used for transmission of the synchronization signal (block 270). Because the synchronization signal and CSI reference signal are transmitted over the same antenna port, the user terminal 40 can synchronize with the OFDM system using the CSI reference signal received over the same port as the synchronization signal (block 280).

Figure 17:
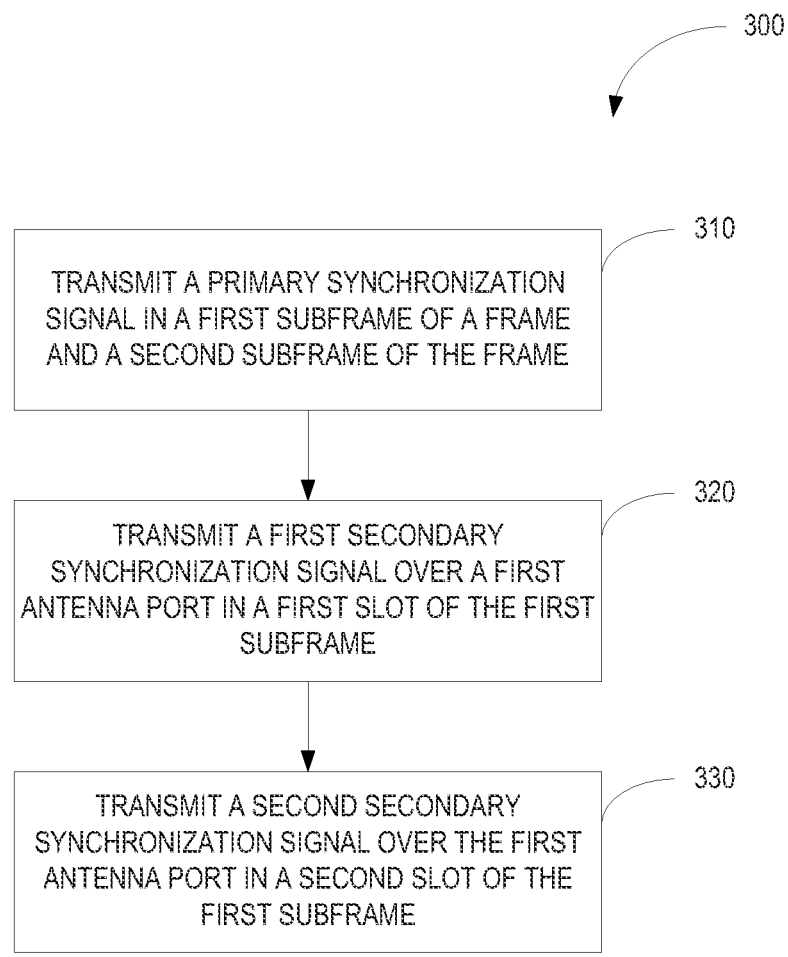
FIG. 17 illustrates an exemplary method of transmitting synchronization signals to facilitate time and frequency synchronization.

FIG. 17 illustrates an exemplary method 300 of transmitting reference signals used for synchronization in an OFDM system that is implemented by the base station 20. In this method, the base station transmits a primary synchronization signal in a first subframe of a frame and a second subframe of the frame (block 310). The base station transmits a first secondary synchronization signal over a first antenna port in a first slot of the first subframe (block 320). To facilitate improved frequency synchronization, the base station also transmits a second secondary synchronization signal over the first antenna port in a second slot of the first subframe (block 330).

Figure 18:
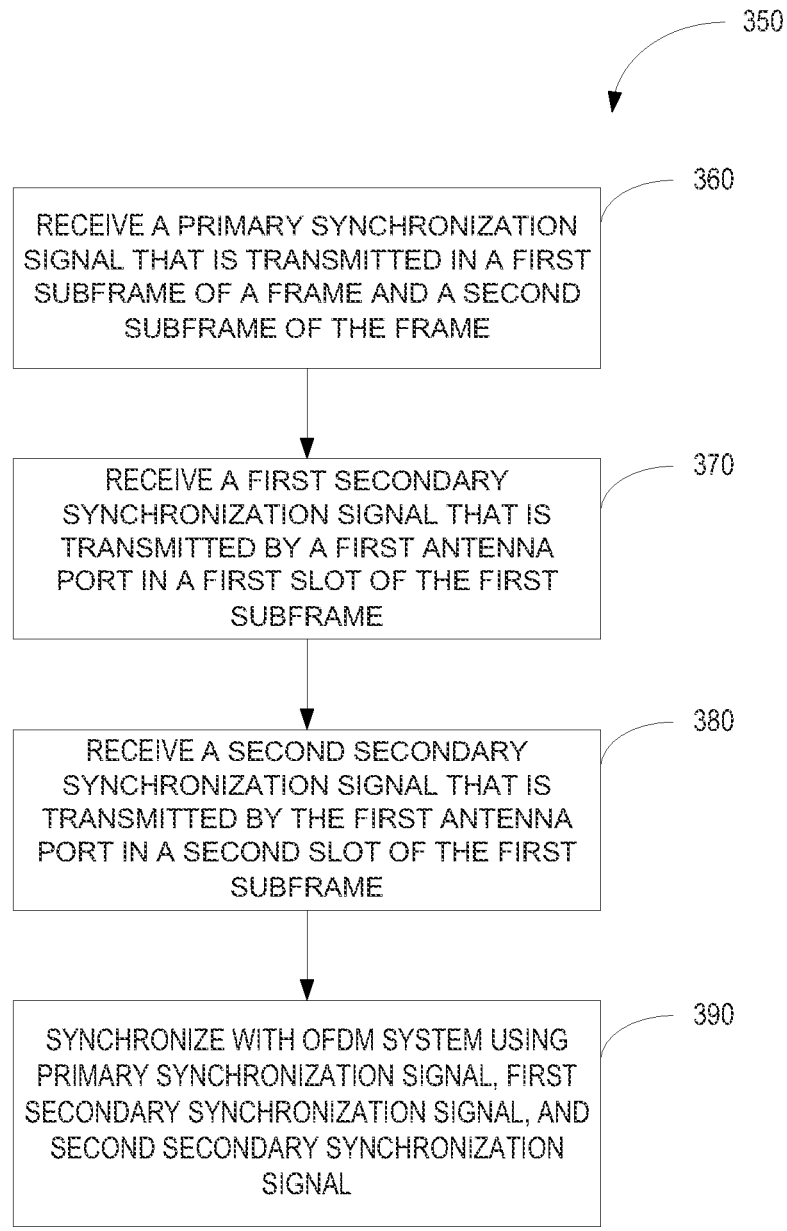
FIG. 18 illustrates an exemplary method of time and frequency synchronization using synchronization signals transmitted in the first and second slots of the same subframe.

FIG. 18 illustrates an exemplary method 350 of synchronization implemented by a user terminal 60. The user terminal 40 receives a primary synchronization signal that is transmitted in a first subframe of a frame and a second subframe of the frame (block 360). The user terminal 40 receives a first secondary synchronization signal that is transmitted by a first antenna port in a first slot of the first subframe (block 370). The user terminal 40 also receives a second secondary synchronization signal that is transmitted by the first antenna port in a second slot of the first subframe (block 380). The user terminal 40 can then synchronize with the OFDM system using the primary synchronization signal, the first secondary synchronization signal, and the second secondary synchronization signal (block 390).

Figure 19:
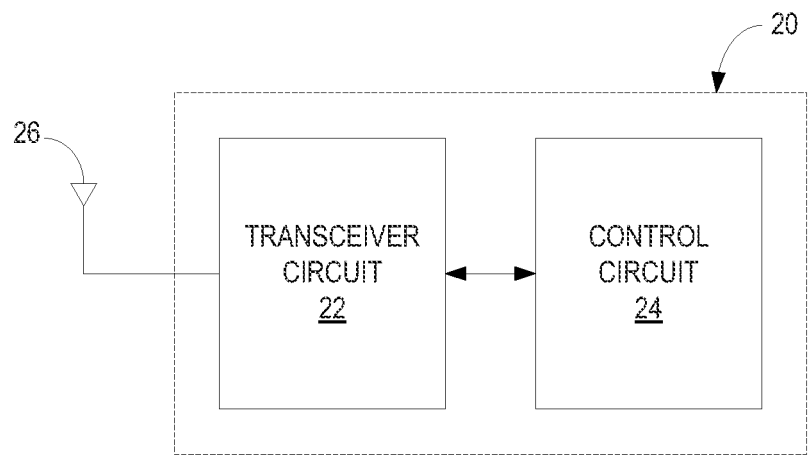
FIG. 19 illustrates an exemplary base station according to one embodiment.
Figure 20:
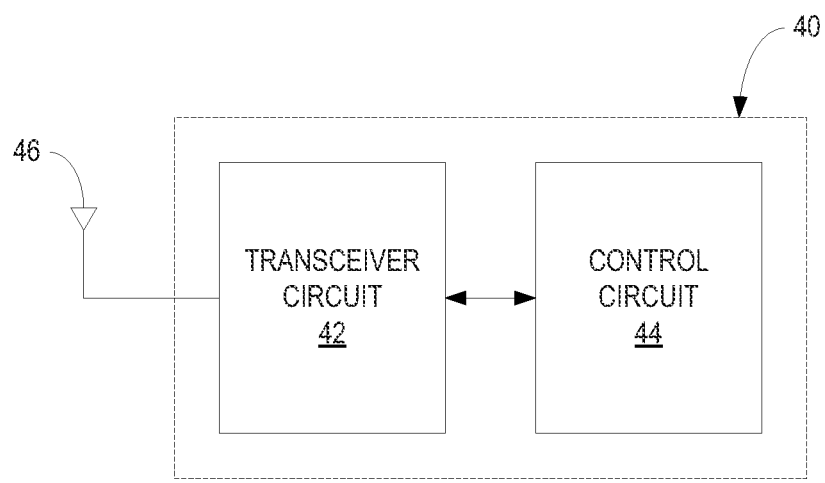
FIG. 20 illustrates an exemplary user terminal according to one embodiment.

FIG. 19 illustrates an exemplary base station 20 and user terminal 40 according to one embodiment. As shown in FIG. 19, the base station 20 generates and sends reference signal to the user terminal 40.

The base station 20 comprises a transceiver circuit 22 and a control circuit 24. The transceiver circuit 22 may, for example, comprise a transmitter and receiver configured to operate in an LTE system or other OFDM system. The transmitter and receiver are coupled to one or more antennas 26. The control circuit 24 controls the operation of the base station 20 according to the LTE standard. The functions of the control circuit 24 may be implemented by one or more microprocessors, hardware, firmware, or a combination thereof. The functions of the control circuit 24 include generating and sending reference signals for synchronization as described in this application. The control circuit 24 may be configured to transit reference signal for synchronization implement the methods shown in FIGS. 13, 15, and 17.

The user terminal 40 comprises a transceiver circuit 42 and a control circuit 44. The transceiver circuit 42 may, for example, comprise a transmitter and receiver configured to operate in an LTE system or other OFDM system. The transmitter and receiver are coupled to one or more antennas 46. The control circuit 44 controls the operation of the user terminal 40 according to the LTE standard. The functions of the control circuit 44 may be implemented by one or more microprocessors, hardware, firmware, or a combination thereof. The functions of the control circuit 44 include synchronization with the base station 20 as described in this application. In this regard, the control circuit 44 may be configured to implement the methods shown in FIGS. 14, 16, and 18.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of transmitting reference signals for synchronization in an Orthogonal Frequency Division Multiplexing (OFDM) system, said method comprising:
   transmitting a first channel state information (CSI) reference signal in a first of a plurality of subframes in accordance with a first configuration of transmission resources, wherein the first configuration of transmission resources defines a first allocation of time and frequency resources for the first CSI reference signal;
   transmitting a second CSI reference signal in a second slot of one or more of the plurality of subframes in accordance with a second configuration of transmission resources, wherein the second configuration of transmission resources defines a second allocation of time and frequency resources for the second CSI reference signal, and
   wherein transmitting the first CSI reference signal in accordance with the first configuration and transmitting the second CSI reference signals in accordance with the second configuration comprises transmitting the first and second CSI reference signals from the same antenna port in both the first slot and the second slot of at least a first subframe of the plurality of subframes, and
   wherein the same antenna port is used for transmission of the first and second CSI reference signals to ensure a user terminal in the OFDM system can utilize the first and second CSI reference signals for synchronization assistance.

2. The method of claim 1 wherein:
   transmitting the first CSI reference signal in accordance with the first configuration comprises periodically transmitting the first CSI reference signal in the first slot of two or more subframes with a first repetition frequency; and
   transmitting the second CSI reference signal in accordance with the second configuration comprises periodically transmitting the second CSI reference signal in the second slot of two or more of the subframes with a second repetition frequency different from the first repetition frequency.

3. The method of claim 1 wherein:
   the first configuration of transmission resources supports transmission of CSI reference signals from a first set of antenna ports;
   the second configuration of transmission resources supports transmission of CSI reference signals from a second set of antenna ports; and
   the first and second sets of antenna ports include at least one common antenna port for transmission of the first and second CSI reference signals.

4. The method of claim 1 further comprising transmitting configuration information for the first and second CSI reference signals to the user terminal on a downlink broadcast channel.

5. The method of claim 1, wherein each of the plurality of subframes comprises at least 14 OFDM symbols.

6. The method of claim 1, wherein each of the plurality of subframes has a duration of 1 millisecond.

7. A base station in an Orthogonal Frequency Division Multiplexing (OFDM) system, said base station comprising:
a transceiver circuit configured to communicate with a user terminal over a wireless communicate channel; and
a control circuit providing reference signals for transmission to the user terminal via the transceiver circuit, said control circuit being configured to:
transmit a first channel state information (CSI) reference signal in a first slot of one or more subframes;
transmit a second CSI reference signal in a second slot of one or more of the same subframes; and
transmit the first and second CSI reference signals from the same antenna port to ensure the user terminal in the OFDM system can utilize the first and second CSI reference signals for synchronization assistance.

8. The base station of claim 7 wherein the control circuit is further configured to:
periodically transmit the first CSI reference signal in the first slot of the two or more subframes with a first repetition frequency; and
periodically transmit the second CSI reference signal in the second slot of two or more of the subframes with a second repetition frequency different from the first repetition frequency.

9. The base station of claim 7 wherein the control circuit is further configured to:
transmit a first set of CSI reference signals in the first slot from a first set of antenna ports;
transmit a second set of CSI reference signals in the second slot from a second set of antenna ports; and
wherein the first and second sets of antenna ports include at least one common antenna port for transmission of the first and second CSI reference signals.

10. The base station of claim 7 wherein the control circuit is further configured to transmit configuration information for the first and second CSI reference signals to the user terminal on a downlink broadcast channel.

11. A method of synchronization in an Orthogonal Frequency Division Multiplexing (OFDM) system, said method comprising:
receiving a first channel state information (CSI) reference signal in a first slot of a plurality of subframes in accordance with a first configuration of transmission resources, wherein the first configuration of transmission resources defines a first allocation of time and frequency resources for the first CSI reference signal;
receiving a second CSI reference signal in a second slot of one or more of the plurality of subframes in accordance with a second configuration of transmission resources difference from the first configuration, wherein the second configuration of transmission resources defines a second allocation of time and frequency resources for the second CSI reference signal;
wherein receiving the first CSI reference signal in accordance with the first configuration and receiving the second CSI reference signal in accordance with the second configuration comprises receiving CSI reference signals transmitted on the same antenna port during both the first slot and the second slot of at least a first subframe of the plurality of subframes; and
synchronizing with the OFDM system using the first and second CSI reference signals received during the first subframe.

12. The method of claim 11 wherein:
receiving the first CSI reference signal in accordance with the first configuration of transmission resources comprises periodically receiving the first CSI reference signal in the first slot of the two or more subframes with a first repetition frequency; and
receiving the second CSI reference signal in accordance with the second configuration of transmission resources comprises periodically receiving the second CSI reference signal in the second slot of two or more of the subframes with a second repetition frequency different from the first repetition frequency.

13. The method of claim 11 wherein:
the first configuration of transmission resources supports transmission of CSI reference signals from a first set of antenna ports;
the second configuration of transmission resources supports transmission of CSI reference signals from a second set of antenna ports; and
the first and second sets of antenna ports include at least one common antenna port for receiving of the first and second CSI reference signals.

14. The method of claim 11 further comprising receiving configuration information for the first and second CSI reference signals on a downlink broadcast channel.

15. A user terminal in an Orthogonal Frequency Division Multiplexing (OFDM) system, said user terminal comprising:
a transceiver circuit configured to communicate with a base station over a wireless communicate channel; and
a control circuit for synchronizing with the OFDM system, said control circuit being configured to:
receive a first channel state information (CSI) reference signal in a first slot of a plurality of subframes in accordance with a first configuration of transmission resources, wherein the first configuration of transmission resources defines a first allocation of time and frequency resources for the first CSI reference signal;
receive a second CSI reference signal in a second slot of one or more of the plurality of subframes in accordance with a second configuration of transmission resources difference from the first configuration, wherein the second configuration of transmission resources defines a second allocation of time and frequency resources for the second CSI reference signal;
receive the first and second CSI reference signals on the same antenna port in at least one of the plurality of subframes; and
synchronize with the OFDM system using the first and second CSI reference signals received on the same antenna port in the at least one subframe.

16. The user terminal of claim 15 wherein:
the first configuration of transmission resources supports transmission of CSI reference signals from a first set of antenna ports;
the second configuration of transmission resources supports transmission of CSI reference signals from a second set of antenna ports; and
the first and second sets of antenna ports include at least one common antenna port for receiving of the first and second CSI reference signals.

17. The user terminal of claim 15 wherein the first set of antenna ports has a larger number of antenna ports than the second set.

18. The user terminal of claim 15 wherein the control circuit is further configured to receive configuration information for the first and second CSI reference signals on a downlink broadcast channel.

19. The user terminal of claim 15, wherein each of the plurality of subframes comprises at least 14 OFDM symbols.

20. The user terminal of claim 15, wherein each of the plurality of subframes has a duration of 1 millisecond.

* * * * *

UNITED STATES PATENT AND TRADEMARK OFFICE
CERTIFICATE OF CORRECTION

Page 1 of 2

PATENT NO. : 12,004,107 B2
APPLICATION NO. : 18/131823
DATED : June 4, 2024
INVENTOR(S) : Koorapaty et al.

It is certified that error appears in the above-identified patent and that said Letters Patent is hereby corrected as shown below:

In the Specification

In Column 1, Line 44, delete "second" and insert -- secondary --, therefor.

In Column 2, Line 50, delete "wireless communicate channel;" and insert -- wireless communication channel; --, therefor.

In Column 2, Line 63, delete "wireless communicate channel;" and insert -- wireless communication channel; --, therefor.

In Column 3, Line 7, delete "wireless communicate channel;" and insert -- wireless communication channel; --, therefor.

In Column 3, Line 52, delete "wireless communicate channel;" and insert -- wireless communication channel; --, therefor.

In Column 3, Line 67, delete "wireless communicate channel;" and insert -- wireless communication channel; --, therefor.

In Column 4, Line 11, delete "wireless communicate channel;" and insert -- wireless communication channel; --, therefor.

In Column 7, Line 58, delete "rn-sequences" and insert -- m-sequences --, therefor.

In Column 7, Line 60, delete "rn-sequences," and insert -- m-sequences, --, therefor.

In Column 8, Line 1, delete "rn-sequences" and insert -- m-sequences --, therefor.

In Column 11, Line 51, delete "transit" and insert -- transmit --, therefor.

Signed and Sealed this
Twenty-second Day of October, 2024

Katherine Kelly Vidal
*Director of the United States Patent and Trademark Office*

CERTIFICATE OF CORRECTION (continued)
U.S. Pat. No. 12,004,107 B2

In Column 11, Line 52, delete "implement the" and insert -- implemented in the --, therefor.

In the Claims

In Column 12, Line 13, in Claim 1, delete "first" and insert -- first slot --, therefor.

In Column 13, Line 4, in Claim 7, delete "wireless communicate channel;" and insert -- wireless communication channel; --, therefor.

In Column 13, Line 53, in Claim 11, delete "difference from" and insert -- different from --, therefor.

In Column 14, Line 31, in Claim 15, delete "wireless communicate channel;" and insert -- wireless communication channel; --, therefor.

In Column 14, Line 44, in Claim 15, delete "difference from" and insert -- different from --, therefor.